United States Patent [19]

Kehr et al.

[11] 3,897,372

[45] July 29, 1975

[54] SMOKE-FLAME RETARDANT HYDROPHILIC URETHANE AND METHOD

[75] Inventors: Clifton Leroy Kehr, Silver Spring; Robert M. Murch, Ashton; Nelson Samuel Marans, Silver Spring, all of Md.

[73] Assignee: W. R. Grace & Co., New York, N.Y.

[22] Filed: Apr. 17, 1974

[21] Appl. No.: 461,675

[52] U.S. Cl. 260/2.5 AJ; 260/2.5 AK; 260/2.5 AD; 260/2.5 AM; 260/2.5 BE; 260/45.8 NT; 260/77.5 SS; 260/849

[51] Int. Cl.² ............ C08G 18/14; C08G 18/10; C08K 3/20; C08K 3/38

[58] Field of Search .... 260/2.5 AJ, 77.5 SS, 2.5 BE, 260/2.5 AM, 45.8 NT, 2.5 AK, 849

[56] References Cited

UNITED STATES PATENTS

| | | | |
|---|---|---|---|
| 2,684,953 | 7/1954 | Stilbert et al. | 260/17.3 |
| 3,134,742 | 5/1964 | Wismer et al. | 260/2.5 AJ |
| 3,262,894 | 7/1966 | Green | 260/2.5 AJ |
| 3,625,872 | 12/1971 | Ashida | 260/77.5 SS |
| 3,640,920 | 2/1972 | Cear | 260/2.5 AK |
| 3,714,047 | 1/1973 | Marion | 260/2.5 AJ |
| 3,737,400 | 6/1973 | Kumasaka | 260/2.5 AK |
| 3,810,851 | 5/1974 | Norman | 260/2.5 BE |
| 3,812,618 | 5/1974 | Wood | 260/2.5 AD |
| 3,812,619 | 5/1974 | Wood | 260/2.5 AD |

FOREIGN PATENTS OR APPLICATIONS

| | | | |
|---|---|---|---|
| 1,137,465 | 12/1968 | United Kingdom | 260/2.5 BE |

OTHER PUBLICATIONS

Hilado, Carlos, Flammability Handbook for Plastics Technomic Publishing Co., Inc., Stamford, Conn., 1969, pp. 87–88.
Chemical Abstracts, Vol. 73 No. 26206d.

*Primary Examiner*—Donald E. Czaja
*Assistant Examiner*—C. Warren Ivy
*Attorney, Agent, or Firm*—Eugene M. Bond

[57] ABSTRACT

The invention disclosed relates to a new polyurethane composition having improved flame retardancy and reduced smoke density; and to a method for preparing same. The present composition includes a hydrophilic polyurethane having alumina hydrate, and a melamine-acid containing compound disposed therein, and in an embodiment composition silica is further included to lower smoke density values.

12 Claims, No Drawings

SMOKE-FLAME RETARDANT HYDROPHILIC URETHANE AND METHOD

This invention relates to a new improved polyurethane composition having improved flame retardancy and reduced smoke density, and to a method for preparing such compositions.

Numerous attempts have been made in the prior art seeking solutions to improving flame retardancy for polyurethane compositions. Typically, these attempts have provided compositions which only limitly improve the flame retardant capacity while greatly increasing the cost and often the weight of the final composition.

Prior art attempts at improving flame retardancy for polyurethane compositions have often increased smoke density values for such compositions. Although improved flame retardancy is improtant, it is equally important to improve upon smoke density values since smoke is equally dangerous to safety in fires.

It has now been found that by practice of the present invention, there results a new improved flame retardant polyurethane which have improved low smoke density and is easily prepared both commercially and economically.

By the present method, smoke-flame retardant polyurethanes may be prepared having hydrophilic crosslinked polyurethane structures by reacting a particular isocyanate capped polyoxyethylene polyol with large amounts of an aqueous slurry of an aluminum hydrate, a melamine containing compound, and in an embodiment the further inclusion of silica is disposed therein. The thus generated polyurethane having aluminum hydrate, melamine, and silica, i.e. in the embodiment, uniformly disposed throughout the structure is found to have improved flame retardancy and low smoke density values.

Generally stated, the present polyurethane composition comprises a hydrophilic polyurethane compositon having uniformly dispersed therein, an aluminum hydrate additive, and a melamine containing compound, all additives being effectively used in combination. In an embodiment, silica is further included to provide even lower smoke density values for the prepared polyurethane foam composition.

Because the additives employed herein must be uniformly dispersed in the finally generated polyurethane structure, it is advantageous to use a hydrophilic polyurethane such as one prepared by reacting a resin and relatively large amounts of water or aqueous reactant. In this manner, the present additives can be introduced during the reaction step and thereby insure uniform distribution without interference resulting with the polymerization reaction.

One group or resins used to generate polyurethanes useful herein is disclosed in co-pending, commonly assigned U.S. Patent application Ser. No. 404,823 filed Oct. 9, 1973, the effective portions of the disclosure of which are incorporated herein by reference. Generally, these foams are crosslinked polyurethane foams prepared by using a capped polyoxyethylene glycol reactant and massive amounts of water.

The polyoxyethylene polyols used herein are water soluble reaction products derived from polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound.

It is possible and sometimes desirable to incorporate various amounts of a relatively hydrophobic comonomer into the ethylene oxide based polymerization products. Comonomers such as propylene oxide or butylene oxide may be copolymerized as a random copolymer, block copolymer, or both, such that the copolymers remain hydrophilic while having other desirable features for certain applications, namely, improved low temperature flexibility, resistance to compression set, resiliency and the like. Up to about 40–60 mole percent but desirably about 25–45 mole percent of the relatively hydrophobic comonomer may be copolymerized with the ethylene oxide monomer and still yield hydrophilic crosslinked network foams when those products are used as polyol intermediates in practicing the present invention. Thus, throughout the text of this document, the term "polyoxyethylene polyol" is intended to include not only homopolymers of ethylene oxide but also hydrophilic copolymers of ethylene oxide sich as those described above wherein all of these polyol derivatives have a hydroxyl functionality of about two or greater and an ethylene oxide content ranging from about 40 mole percent to about 100 mole percent, and preferably greater than about 55 mole percent.

Polyoxyethylene polyol used as a reactant in preparing the capped resin to be foamed may have a weight average molecular weight of about 200 to about 20,000, and preferably between about 600 to about 6,000 with a hydroxyl functionality of about 2 or greater, preferably from about 2 to about 8.

Polyoxyethylene polyol is capped by reaction with a polyisocyanate or polyisothiocyanates. The capping materials include PAPI (a polyaryl polyisocyanate as defined in U.S. Pat. No. 2,683,730), tolylene diisocyanate, triphenylmethane-4,4',4'',-triisocyanate, benzene-1,3,5-triisocyanate, toluene-2,4,6-triisocyanate, diphenyl-2,3,3'-triisocyanate, hexamethylene diisocyanate, xylene diisocyanate, chlorophenylene diisocyanate, diphenylmethane-4,4'-diisocyanate, naphthalene-1,5-diisocyanate, xylene-alpha, alpha'diisothiocyanate, 3,3'-dimethyl-4,4'-biphenylene diisocyanate, 3,3'dimethoxy-4,4'-biphenylene diisocyanate, 2,2' 5,5'-tetramethyl-4,4'-biphenylene diisocyanate, 4,4'-methylenebis (phenylisocyanate),4,4'-sulfonylbis (phenylisocyanate), 4,4'-methylene diorthotolylisocyanate, ethylene diisocyanate, ethylene diisothiocyanate, trimethylenediisocyanate and the like.

Capping of the polyoxyethylene polyol may be effected using either about stoichiometric amounts of reactants or an excess of the isocyanate to insure complete capping of the polyol.

To effect foaming and preparation of the crosslinked network polymer, the component including the isocyanate capped polyoxyethylene polyol having a functionality about 2 or greater is simply combined with water by most any suitable means such that a crosslinked hydrophilic foam results.

Particularly useful foams may be prepared by first capping a polyoxyethylene polyol with a polyisocyanate such that the capped product has a reaction functionality greater than two. Thereafter, the resin is reacted by combining with water such that a crosslinked foam result. It is also possible to use a capped polyoxyethylene polyol having a functionality approximating 2 in which case a polyfunctional reactive member such as one having three, or up to about 8 reactive amine, hydroxy, thiol, or carboxylate sites per average molecule is included to form a three dimensional crosslinked product. Useful polyfunctional reactive members include materials such as diethylenetriamine, triethylenetetramine, tetraethylenepentamine, polyethyleneiamine, glycerol, trimethylolpropane, pentaerythritol, tolylene-2,4,6-triamine, ethylenediamine, trimethylenediamine, tetramethylenediamine, pentamethylenediamine, hexamethylenediamine, aminoethanol, diethanolamine, hydrazine, triethanolamine, benzene-1,2,4-tricarboxylic acid, nitrilotriacetic acid, citric acid, 4,4'-methylenebis (α-chloraniline), and the like.

Although foaming of the present resin reactant is effected simply, it is also possible to add, although not necessary, supplemental foaming materials such as those well known to the artificial sponge foaming art.

The significance of adding materials such as aluminum hydrate and a melamine containing material; and further in an embodiment compositon, silica, may be realized by means of the Oxygen Index Method, a flammability test for plastics, ASTM D–2863–70. This method describes a procedure for determining the relative flammability of polyurethane by measuring the minimum concentration of oxygen in a slowly rising mixture of oxygen and nitrogen that will just support combustion.

The oxygen index value as used herein is the minimum concentration of oxygen, expressed as volume percent, in a mixture of oxygen and nitrogen that will just support combustion of a material under the conditions of this method.

The minimum concentration of oxygen in a slowly rising mixture of oxygen and nitrogen that will just support combustion is measured under equilibrium conditions of candle-like burning. The balance between the heat from the combustion of the specimen and the heat lost to the surroundings establishes the equilibrium. This point is approached from both sides of the critical oxygen concentration in order to establish the oxygen index.

Another significant and unexpected value of the present polyurethane composition resides in low smoke density determination. Accordingly, not only does the present composition have a superior flame retardant value but also this advantage is supplemented by the fact that should some portion of the composition be consumed by flame, the consumption produces very low smoke density relative to other polyurethane structures which do not include the present additives.

In order to help understand Smoke Chamber data, specific smoke density ($D_s$) vs time (T) may be plotted to obtain a curve.

$D_m$, the maximum smoke density, is recorded at the time the flame or radiant panel starts consuming smoke more rapidly than it is being formed. $D_s$ is the smoke density that prevents visual sighting in a standard room and $T_s$ is obtained at that plot location. The rate, R, is an average slope of the line over the middle 80% of the rise. The parameters are combined to give a Smoke Obscuration Index, SOI, in the following manner:

$$SOI = \frac{D_m \times R}{T_s \times 100}$$

As a rough rule of thumb, SOIs of less than 10 are considered non-hazardous, between 10 and 30, possibly hazardous, and above 30, hazardous.

Usually, $D_m$ is normalized as are LOI figures when comparing two different composite materials by translating the $D_m$ values to a standard weight.

Typically, polyurethane compositions which do not include addition of the special combination of additives now found to be essential, have an oxygen index value of about 15 to about 30. In contrast, the present polyurethane compositions have corresponding oxygen index values up to about 70 and greater.

Typical polyurethanes which are not hydrophilic and do not contain these special additives have SOIs in the range of 200–400. In contrast the SOIs of the present polyurethane compositions range from 10–50.

The present polyurethane compositions include about 50 to about 400 parts of aluminum hydrate additive per 100 parts of prepolymer resin to be reacted. Preferably, amounts of about 100 to about 275 aluminum hydrate, same weight basis, are employed.

Aluminum hydrates, also commonly called alumina hydrates, or hydrated aluminas, for use herein are known and are highly refined, inorganic white granular crystalline powders with the chemical formula of $Al_2O_3 \cdot XH_2O$. These materials generally are produced by the Bayer process from bauxite ore and contain small amounts of soda, iron oxide and silica. They are chemically inert and have been used as a filler in organic systems where a filler is normally employed.

The particle size of useful aluminum hydrate ranges from an average particle size of about 0.5 to about 120 microns. Fine particles having a size of about 6.5 to about 9.5 microns are particularly useful. Also, where color of the resultant polyurethane is important, the aluminum hydrate should have a snow-white color grade.

Melamine containing compounds useful herein include melamine; melamine resin, made of melamine and formaldehyde, butylated melamine resins, melamine-acrylic resins and the like. Desirably and preferably, melamine is added with boric acid in equal parts by weight.

The melamine containing additive is included in an amount from about 1 to about 200 parts by weight per 100 parts by weight resin polymer to be reacted and preferably about 2 to about 100 parts, similar weight basis.

In an embodiment of the present invention, silica is included in the foaming reaction. Effective amounts of silica range from about 1 part by weight to 100 parts by weight per 100 parts by weight of resin polymer to be reacted.

To effect foaming and preparation of the crosslinked network polymer, the component including the resin reactant, i.e. isocyanate capped polyoxyethylene polyol having a functionality about 2 or greater is simply combined with a particular aqueous component, i.e. water. For simplicity, this isocyanate capped reaction component is referred to herein as resin reactant.

The aqueous component may appear as water, a water slurry or suspension, a water emulsion, or a water solution having water soluble materials disposed therein. For convenience, the aqueous component is referred to herein as an aqueous reactant or water.

In contrast to typical polyurethane reactions such as those using catalyst or like promotors where one mole of -NCO is reacted with one half mole water, the present reaction proceeds simply with a large but controlled excess of water.

In typical polyurethane reactions known to the art, it is known that an excess of water may be used in prepolymer foaming formulations to obtain improved foam quality properties. This has been observed inter alia, at page 43 in the publication by Saunders and Frisch entitled "Polyurethanes", published by Interscience Publishers, where it is further observed that if less than stoichiometric amounts of water are used, the foam is more crosslinked, firmer, has lower elongation and higher density. A large excess of water, they observe, will use up the free isocyanate groups, leaving insufficient isocyanate available for effective crosslinking and resulting in the formation of many free amino end groups. As water content increases the foam density decreases and above 30–50% excess water over stoichiometry results in a marked decrease in physical properties.

The dramatic way in which the addition of water influences practice of the present invention is seen by consideration of what may be defined as a Water Index:

$$\frac{\text{equivalents of H}_2\text{O} \times 100}{\text{equivalents of NCO}} = \text{Water Index Value}$$

Keeping in mind that in polyurethane foaming reactions one mole of water ultimately consumes two NCO groups, i.e. 1.0 mole $H_2O$ = 2 equivalents —OH which react with 2 equivalents of NCO. Water Index Value of 100 indicates that the equivalents of water and equivalents of isocyanate are balanced. An Index of 95 indicates that there is a 5% shortage of water equivalents while an Index of 105 indicates a 5% surplus of water equivalents. A slight shortage of water equivalents (i.e. a slight excess of isocyanate), usually 3–5%, is common practice in the prior art, particularly with flexible foams.

Using the present resin reactant and water in amounts from about 0.5 mole $H_2O$/mole NCO groups ($H_2O$ Index Value of 100) up to about 2 moles, $H_2O$/mole NCO groups ($H_2O$ Index Value of 400) results in poor foaming unless materials such as surfactants and catalysts or the like are included. Amounts up to about 2 moles $H_2O$/mole NCO ($H_2O$ Index Value of 400) require a catalyst. When using about 6.5 moles $H_2O$ mole/NCO groups ($H_2O$ Index Value of 1300) up to about 390 moles $H_2O$/mole NCO groups, ($H_2O$ Index Value 78,000) surprisingly good foams result whidh improve in characteristics with added amounts of molar water. Thus, the available water content in the aqueous reactant is from about 6.5 to about 390 moles $H_2O$/NCO groups in the resin reactant, i.e. and $H_2O$ Index Value of about 1300 to about 78,000 and desirably from about 4,000 to about 40,000, i.e. about 20 to about 200 moles $H_2O$/NCO groups.

"Available water" in the aqueous reactant is that water accessible for reaction with the resin reactant, and which is exclusive of water which may layer during reaction, or supplemental water which may be necessary because of further water-absorbtive or water-binding components or additives present in and forming the aqueous reactant.

The use of large molar excesses of water in the aqueous reactant leads to several important advantages and improvements over the conventional flame retardant polyurethane foam compositions. For example, in conventional polyurethane foam compositions, the water concentration must be carefully controlled to near the theoretical amount, usually an amount much less than about an $H_2O$ Index Value of 400 (2.0 moles $H_2O$/NCO groups in the polyurethane reaction components) and the flame retardants must be separately included. This low concentration dictates the use of a catalyst to promote the rate of the polymerization foaming reaction, and requires an intensive mixing step to achieve good mixing of reactants and catalyst so as to insure a controllable and uniform cellular product. Other additives are avoided. In contrast, the present invention requires very large but controlled excess of water, e.g., typically about $H_2O$ Index Value of about 1300 to about 78,000. Using this technique, the product quality and uniformity is not highly sensitive to accuracy of metering or mixing of the aqueous reactant and the use of a polymerization catalyst or promoter is optional. Thus, the present additives are included in the polyurethane structure at the time of foaming.

The hydrophilic foams of the present invention may be formulated so as to be flexible, semi-rigid, or rigid in nature and to be of primarily open cell or primarily closed cell structure as desired.

Because the present polyurethane composition is characterized with high flame retardancy, and low smoke value, it may be used for cushioning for furniture and transportation vehicles, mattresses, foamed coatings for mattress covers and pads, upholstery fabrics, mattress ticking, sound absorbing wall coverings, carpet and rug under padding, and the like. Numerous additional uses will become obvious to those skilled in the art.

EXAMPLE 1

A prepolymer is prepared from 2 moles of polyethylene glycol 1000, one mole of trimethylolpropane and 7.7 moles of the commercial 80/20 mixture of 2,4 and 2,6-tolyldiisocyanate. 200 grams of the prepolymer, 2 grams of silicone surfactant L–520 by Union Carbide were mixed. To this was next added 200 grams of water, the mixture was stirred with a motor driven propeller blade. After creaming, the material was added to a 6 inch × 6 inch × 6 inch open box. The sample was demolded after ten minutes, dried in the oven at 70°C for sixteen hours and then cut into ½ inch × ½ inch × 5 inch strips. The strips were further dried in an oven at 70°C for 16 hours and then equilibrated at 25°C in a room at 50% relative humidity for 16 hours. The oxygen index value by the standard test was found to be 26.2%.

EXAMPLE 2

The procedure of Example 1 was repeated starting with 200 grams of the prepolymer of Example 1, 2.0 grams silicone L–520 surfactant, and 400 grams of aluminum hydrate Alcoa's C–31–C in 200 grams of water. The LOI oxygen index value taken on a vertically sectioned sample previously dried and equilibrated at 50% relative humidity was 39.

EXAMPLE 3

The procedure of Example 1 was repeated except using the further addition of 100 grams of boric acid, 100 grams of melamine which included 300 grams water. The LOI was found to be 57.

EXAMPLE 4

The procedure of Example 1 was repeated except using 200 grams of water and 300 grams of alumina hydrate, all other amounts remaining the same. The LOI of the final foam at 50% relative humidity was 30.

EXAMPLE 5

The procedure of Example 1 was repeated except using additionally 10 grams of boric acid, 10 grams of melamine, 300 grams of alumina hydrate in 200 grams water. The prepared foam had an oxygen index value (LOI) of 43 after drying in 50% relative humidity chamber to equilibrium conditions.

EXAMPLE 6

The procedure of Example 1 was repeated using 100 grams prepolymer, 1 gram silicone surfactant L-520 in the prepolymer; and 150 grams alumina hydrate, 0.1 gram of Calcatone Blue, 5 grams of Phoschek P-30 (an ammonium polyphosphate flame retardant for urethane by Monsanto), 50 grams of glass fibers all in 150 grams of water. The final foam after usual drying had an SOI of 46.

EXAMPLE 7

The procedure of Example 6 was repeated except that the aqueous phase contained 150 grams of alumina hydrate, 50 grams of glass fibers, 5 grams of melamine, 5 grams of boric acid all in 150 grams of water. The SOI value was 27.

EXAMPLE 8

The procedure of Example 7 was repeated except 5.0 grams of silica was added additionally to the aqueous phase. The SOI value was 16.

EXAMPLE 9

The procedure of Example 1 was repeated, no flame-smoke retardants being added. The SOI was about 100.

EXAMPLE 10

The procedure of Example 9 was repeated except using a conventional polyurethane (mainly polyoxypropylene). The SOI was about 350.

It is understood that the foregoing detailed description is given merely by way of illustration and that many variations may be made therein without departing from the spirit of this invention.

What is claimed is:

1. In a polyurethane foam composition formed by reacting a resin prepolymer and a water reactant the improvement which comprises incorporation of a smoke-flame retardant, said retardant consisting essentially of alumina hydrate having an average particle size of about 0.5 to about 120 microns and disposed in an amount of about 50 to about 400 parts by weight per 100 parts prepolymer resin to be reacted, in combination with boric acid and an equal part by weight of a melamine containing compound selected from the group consisting of melamine, melamine-formaldehyde resin, butylated-malamine resin, melamine-acrylic resin wherein said melamine containing compound is included in an amount from about 1 to about 200 parts by weight per part by weight of resin polymer reactant used for polyurethane generation.

2. The polyurethane composition of claim 1 wherein the retardant component further includes silica.

3. The polyurethane composition of claim 2 wherein the amount of silica is from about 1 part by weight to about 100 parts by weight per 100 parts by weight resin polymer reactant used for polyurethane generation.

4. The polyurethane composition of claim 1 wherein the polyurethane composition is prepared using an isocyanate capped polyoxyethylene polyol having a hydroxyl functionality of about 2 to about 8.

5. The polyurethane composition of claim 1 wherein melamine is combined with boric acid in equal parts by weight.

6. A method for preparing a polyurethane foam composition having improved reduced smoke-flame properties which method comprises, reacting an isocyanate capped polyoxyethylene polyol with an aqueous component in the presence of an effective amount of a smoke-flame retardant component, said retardant component consisting essentially of alumina hydrate having an average particle size of about 0.5 to about 120 microns and disposed in an amount of about 50 to about 40 parts by weight per 100 parts prepolymer resin to be reacted, in combination with a melamine-acid containing compound selected from the group consisting of melamine, melamine-formaldehyde resin, butylated-melamine resin, melamine-acrylic resin wherein said melamine containing compound is included in an amount from about 1 to about 200 parts by weight per part by weight of resin polymer reactant used for polyurethane generation.

7. The method of claim 6 wherein silica is included in the smoke-flame component.

8. The method of claim 6 wherein the polyoxyethylene polyol has a weight average molecular weight of about 200 to about 20,000 and wherein the isocyanate capped polyoxyethylene polyol has a isocyanate functionality of about 2 to about 8.

9. The method of claim 8 wherein the molecular weight is about 600 to about 6,000.

10. The method of claim 6 wherein a crosslinking agent is included when the isocyanate functionality is 2.

11. The method of claim 6 wherein the available water content ranges from about 1300 $H_2O$ Index Value to about 78,000 $H_2O$ Index Value.

12. The method of claim 11 wherein the $H_2O$ Index Value is about 4,000 to about 40,000.

* * * * *

UNITED STATES PATENT AND TRADEMARK OFFICE
CERTIFICATE OF CORRECTION

PATENT NO. : 3,897,372

DATED : July 29, 1975

INVENTOR(S) : Clifton Leroy Kehr, Robert M. Murch, & Nelson Samuel Marans

It is certified that error appears in the above-identified patent and that said Letters Patent are hereby corrected as shown below:

Claim 1, line 15, change "part" to -- 100 parts --.

Claim 6, line 17, change "part" to -- 100 parts --.

Signed and Sealed this

Second Day of January 1979

[SEAL]

Attest:

RUTH C. MASON
Attesting Officer

DONALD W. BANNER
Commissioner of Patents and Trademarks